(12) United States Patent
Oveyssi et al.

(10) Patent No.: US 6,710,981 B1
(45) Date of Patent: Mar. 23, 2004

(54) DISK DRIVE HAVING A LOW INERTIA AND NARROW ANGLE COIL

(75) Inventors: Kamran Oveyssi, San Jose, CA (US); Chunjer C. Cheng, Saratoga, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 76 days.

(21) Appl. No.: 10/209,828

(22) Filed: Jul. 31, 2002

(51) Int. Cl.[7] .................................................. G11B 5/55
(52) U.S. Cl. ..................................................... 360/264.9
(58) Field of Search ....................................... 360/264.9

(56) References Cited

U.S. PATENT DOCUMENTS

| | | | | |
|---|---|---|---|---|
| 5,041,935 A | * | 8/1991 | Aruga et al. ............. | 360/264.9 |
| 6,392,845 B1 | * | 5/2002 | Tsuda et al. ............. | 360/264.9 |

* cited by examiner

*Primary Examiner*—George J. Letscher
(74) *Attorney, Agent, or Firm*—Won Tae C. Kim, Esq.; Milad G. Shara, Esq.; Alan W. Young, Esq.

(57) ABSTRACT

A disk drive includes a voice coil motor (VCM) having a narrow coil angle and a magnet magnetized with two or three pole pairs. The VCM magnet may define first, second and third sections, the second section being magnetically polarized in an axial direction that is opposite to that of the first and third sections. The first radial leg of the VCM coil faces the second section and the second radial leg faces the third section when the head is positioned at a non-operational position. The first radial leg faces the first section and the second radial leg faces the second section when the head is reading and/or writing to the data portion of the disk. Alternatively, the VCM magnet defines first and second sections that are magnetized in opposite axial directions. The first and second radial legs of the VCM coil respectively face the first and the second sections when the head is positioned over the data portion of the disk and only the first radial leg faces the second section when the head is at a non-operational position.

15 Claims, 11 Drawing Sheets

DISK DRIVE HAVING A LOW INERTIA AND NARROW ANGLE COIL

BACKGROUND OF THE INVENTION

1. Field of the Invention

This invention relates to magnetic hard disk drives.

2. Description of the Prior Art and Related Information

Technological advances and competition in the disk drive industry have benefited both the enterprise and consumers markets by making available ever-higher capacity and performing drives at attractive prices. In some high performance small form factor (e.g., 3.5" and below) drives where fast data access is critical, the read/write data tracks are limited to a relatively small portion of the disk surface. For example, such disks may have data tracks that occupy only a small portion of the available recordable surface area, such as between the outer edge (or outer diameter—OD) and the middle (or middle diameter—MD) of the disk, for example. Although storage capacity is necessarily sacrificed by limiting the data tracks to a small portion of the available surface area of the disk, the time required for the actuator to swing from the OD of the data tracks to the ID of the data tracks is markedly reduced. In turn, this results in reduced access time, for a given rotational speed of the disk. Such disk drives are commonly called short stroke or de-stroke drives. In some de-stroke drives, the data tracks can occupy, for example, as little as one third of the available recording surface area of the disk.

When the head stack assembly of a disk drive is in a non-operational position, the read/write heads may be "parked" in a position away from the recording surface of the disk. Such parking position may be located, for example, at the ID of the disk in a contact start stop (CSS) zone. The CSS zone of a disk may be textured to prevent stiction between the slider and the surface of the CSS zone. Alternatively, the slider may be padded, to reduce the contact area of the slider with the CSS zone, thereby also avoiding stiction problems with the CSS zone. Alternatively, a ramp load located at the OD of the disk may be used to load and unload the read/write heads during non-operation of the disk drive. In the case of CSS de-stroke drives, even though the actuator only seeks from OD to near MD (or the inner most data track) of the disk during read/write operations, the actuator heads park at the ID of the disk when the drive is turned off or in sleep mode. To park, therefore, the heads must travel the full distance from their current position over the data tracks between OD and MD to the CSS zone adjacent the ID of the disk. The actuators of de-stroke drives, therefore, are conventionally designed with a VCM having a conventional coil angle (i.e., the angle defined by the radial legs of the coil windings of the VCM) and a conventionally sized VCM magnet having two magnetic poles. However, in the case of de-stroke disk drives, the size, structure and mode of operation of conventional actuator assemblies and VCMs have been found to be non-optimal.

What are needed, therefore, are actuators and VCMs that are specifically configured for optimal use in de-stroke drives. What are also needed are high performance de-stroke disk drives containing such specifically configured actuators and VCMs.

SUMMARY OF THE INVENTION

This invention can be regarded as a disk drive, including a disk having a recording surface, the recording surface defining a data portion; a head stack assembly including an actuator body; an actuator arm cantilevered from the actuator body; a head coupled to the actuator arm for reading from and writing to the data portion; a coil cantilevered from the actuator body in an opposite direction from the actuator arm, the coil defining a first radial leg and a second radial leg; and a VCM magnet disposed away from the coil so as to define an air gap, the VCM magnet defining a first section, a second section and a third section, the second section being magnetically polarized in an axial direction that is opposite to an axial direction of magnetic polarization of the first and third sections. The first radial leg faces the second section and the second radial leg faces the third section across the air gap when the head is positioned at a predetermined non-operational position over the disk. The first radial leg faces the first section and the second radial leg faces the second section across the air gap when the head is reading from or writing to the data portion.

The predetermined non-operational position may be located within a contact start stop (CSS) area of the disk. Alternatively, the predetermined non-operational position may be located away from the disk and adjacent to an outer diameter of the disk. The data portion defined on the recording surface of the disk may be bounded by the outer diameter of the disk and a medial diameter of the disk. A first magnetic polarity transition zone may be defined between the first and second sections and a second magnetic polarity transition zone may be defined between the second and third sections. The disk drive may be configured to reverse the polarity of the current applied to the coil as the first radial leg passes over the first magnetic polarity transition zone and the second radial leg passes over the second magnetic polarity transition zone. The disk drive may also include a bias force applier, the bias force applier being configured to apply a force that biases the head stack assembly in a bias direction. The bias force may be directed toward the outer diameter of the disk. Alternatively, the bias force may be directed toward the inner diameter of the disk.

According to another embodiment thereof, the present invention is a disk drive, comprising a disk having a recording surface, the recording surface defining a data portion; a head stack assembly including an actuator body; an actuator arm cantilevered from the actuator body; a head coupled to the actuator arm for reading from and writing to the data portion; a coil cantilevered from the actuator body in an opposite direction from the actuator arm, the coil defining a first radial leg and a second radial leg; and a VCM magnet disposed away from the coil so as to define an air gap, the VCM magnet defining a first section and a second section, the first section being magnetically polarized in an axial direction that is opposite to an axial direction of magnetic polarization of the second section. The first and second radial legs respectively face the first and the second sections across the air gap when the head is positioned over the data portion and only the first radial leg faces the second section when the head is at a predetermined non-operational position over the disk.

The predetermined non-operational position may be located within a contact start stop (CSS) area of the disk. Alternatively, the predetermined non-operational position may be located away from the disk and adjacent to an outer diameter of the disk. The data portion defined on the recording surface of the disk may be bounded by the outer diameter of the disk and a medial diameter of the disk. The disk drive preferably also includes a bias force applier, the bias force applier being configured to apply a force that biases the head stack assembly in a bias direction. The bias force may be directed toward the inner diameter of the disk or may be directed toward the outer diameter of the disk.

DESCRIPTION OF PREFERRED EMBODIMENTS

Figure 1:
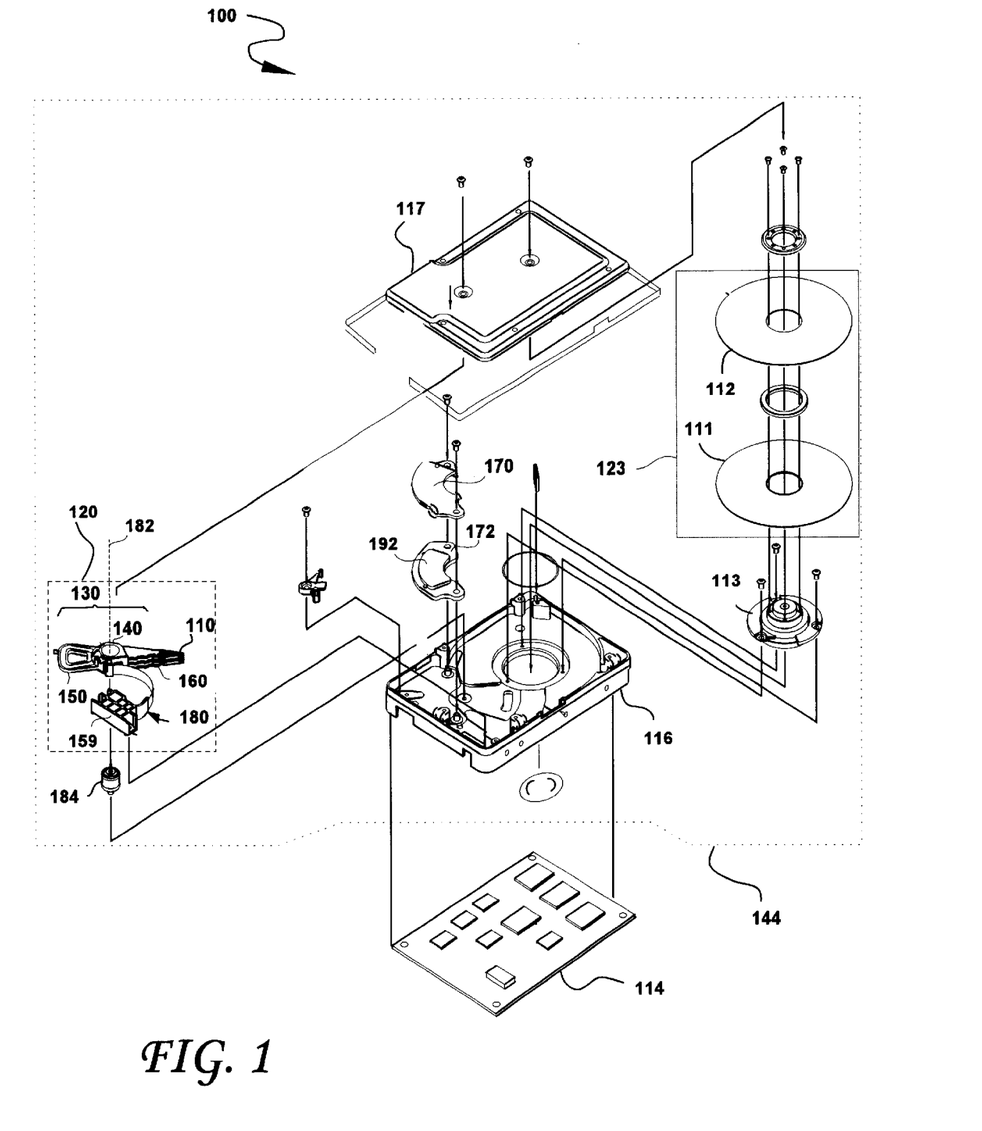
FIG. 1 shows the principal components of a magnetic disk drive constructed in accordance with the present invention.

FIG. 1 shows the principal components of a magnetic disk drive 100 constructed in accordance with the present invention. With reference to FIG. 1, the disk drive 100 comprises a HDA 144 and a PCBA 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the HSA 120 on the base 116. The spindle motor 113 rotates the disk stack 123 at a constant angular velocity. The HSA 120 comprises a swing-type or rotary actuator assembly 130, at least one HGA 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160. The data tracks on the disks 111, 112 may occupy only a portion of the available recording surface thereof For example, the data portion (where the data tracks are laid out on the recording surface of the disk) of each of the disks 111, 112 may span an area between the OD of the disk and a MD thereof.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers (heads) thereof to sweep radially over the disk(s) 111, 112.

Figure 2:
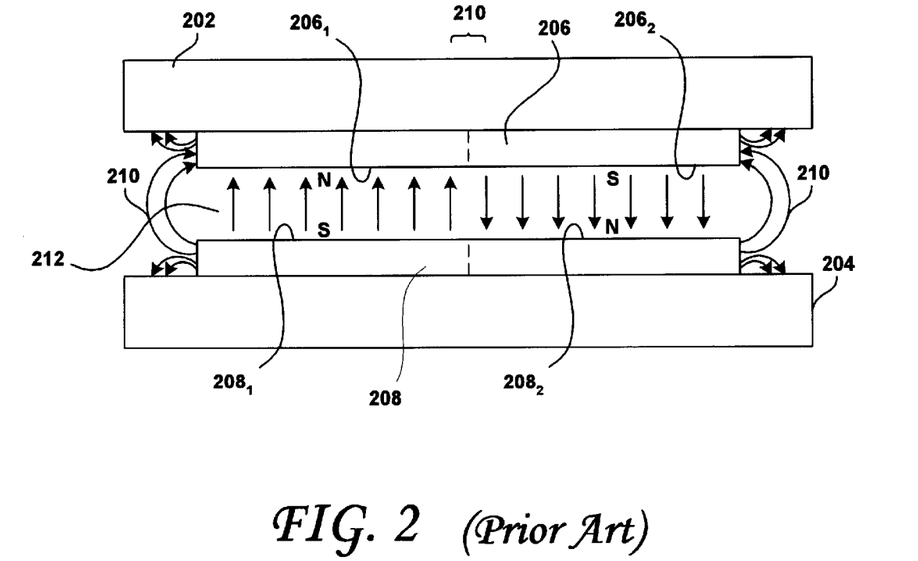
FIG. 2 is a representation of magnetic flux fields created by the permanent magnets of a VCM.
Figure 3:
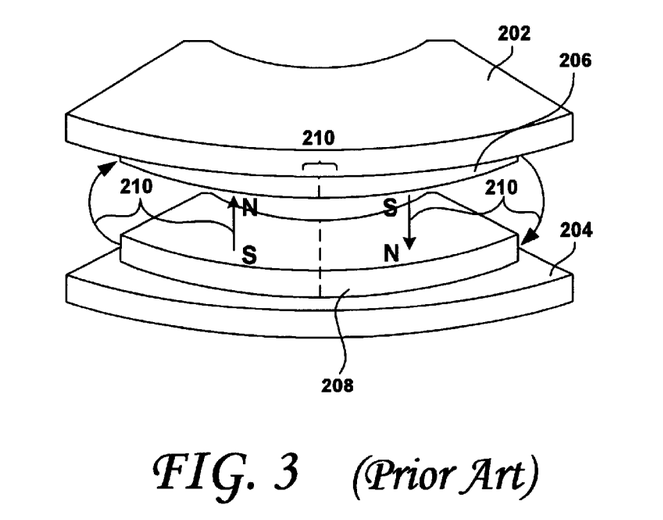
FIG. 3 is a perspective representation of FIG. 2.

FIG. 2 is a representation of magnetic flux fields in a conventional permanent magnet arrangement forming a component of a VCM. FIG. 3 is a perspective representation of FIG. 2. To enable the magnetic flux field 210 to be clearly represented, the coil portion 150 of the VCM is omitted from both FIGS. 2 and 3. Considering now these figures collectively, conventional disk drive VCMs include a top back iron 202 and a lower back iron 204. A top VCM magnet 206 is attached to the top back iron 202 and defines a first section 206$_1$ that is magnetically polarized in a first axial direction and a second section 206$_2$ that is magnetically polarized in a second direction that is opposite the direction of magnetic polarization of the first section. Similarly, a bottom VCM magnet 208 is attached to the bottom back iron 204 and defines a first section 208$_1$ that is magnetically polarized in a first axial direction and a second section 208$_2$ that is magnetically polarized in a second direction that is opposite both to the direction of magnetic polarization of the first section and the direction of magnetic polarization of the second section of the top VCM magnet 206. Conventional VCMs are designed to provide a uniform magnetic field 210 across the stroke of the actuator assembly (not shown in FIG. 2) to each of the two radial legs of the coil. Conventionally, while one radial leg is subjected to a magnetic field having a north-south polarity, the other radial leg of the conventional VCM coil is always subjected to a magnetic field having a south-north polarity. The VCM has a magnetic transition zone 210 between the two magnetic field directions, which the conventional coil does not cross during normal operation. In conventional VCMs, therefore, each radial leg of the coil of the VCM always faces one magnetic polarity of the VCM magnet across the air gap 212 between the coil and the magnet.

To reduce the inertial of the actuator, one aspect of the present invention includes configuring the VCM of the drive to define a comparatively narrow coil angle, relative to conventional VCM coil angles. A narrow coil allows the cost thereof to be reduced and/or may enable the magnitude of the current applied to the coil to be decreased, which advantageously enables he drive to operate cooler than it would otherwise operate using a conventionally configured VCM coil. The present invention also allows the seek time performance of the drive to be improved, all other parameters remaining unchanged. The present narrow coil angle VCM may be advantageously used in de-stroke drives that include a VCM magnet that is magnetized with two or three magnetic pole pairs, as detailed below.

Figure 19:
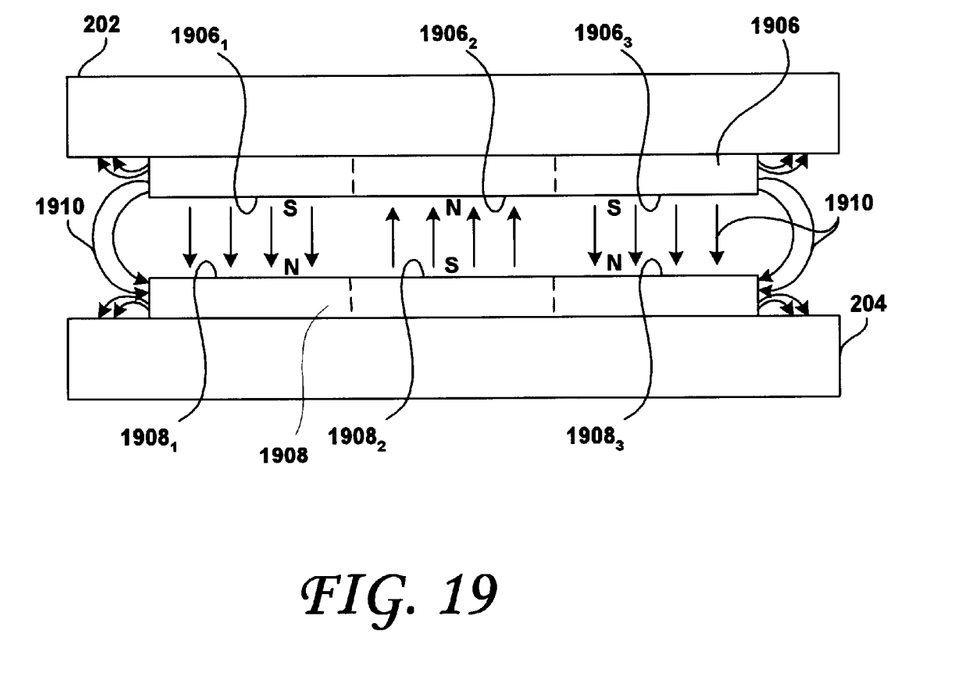
FIG. 19 is a representation of magnetic flux fields created by three-pole permanent magnets of a VCM, according to the present invention.

FIG. 19 is a representation of magnetic flux fields in a permanent magnet arrangement forming a component of a VCM according to an embodiment of the present invention, in which the constituent magnets 1904, 1906 include three magnetic pole pairs. To enable the magnetic flux field 1910 to be clearly represented, the coil portion 150 of the VCM is omitted from FIG. 19. As shown, a VCM according to an embodiment of the present invention may include a top back iron 202 and a lower back iron 204. As shown, one side of the top VCM magnet 1906 that is attached to the top back iron 202 defines a first section $1906_1$, a second section $1906_2$ and a third section $1906_3$. The second section $1906_2$, as shown, is magnetically polarized in an axial direction (see arrows) that is opposite to the direction of axial polarization of the first and third sections $1906_1$, $1906_3$. Similarly, one side of the bottom VCM magnet 1908 attached to the lower back iron 204 defines a first section $1908_1$, a second section $1908_2$ and a third section $1908_3$. The second section $1908_2$, as shown, is magnetically polarized in an axial direction (see arrows) that is opposite to both the direction of axial polarization of the first and third sections $1908_1$, $1908_3$ and opposite the direction of axial polarization of the second section $1906_2$ of the top VCM magnet 1906. For each of the top and bottom VCM magnets 1906, 1908, a first magnetic polarity transition zone is defined between the first and second sections, a second magnetic polarity transition zone is defined between the second and third sections.

Figure 4:
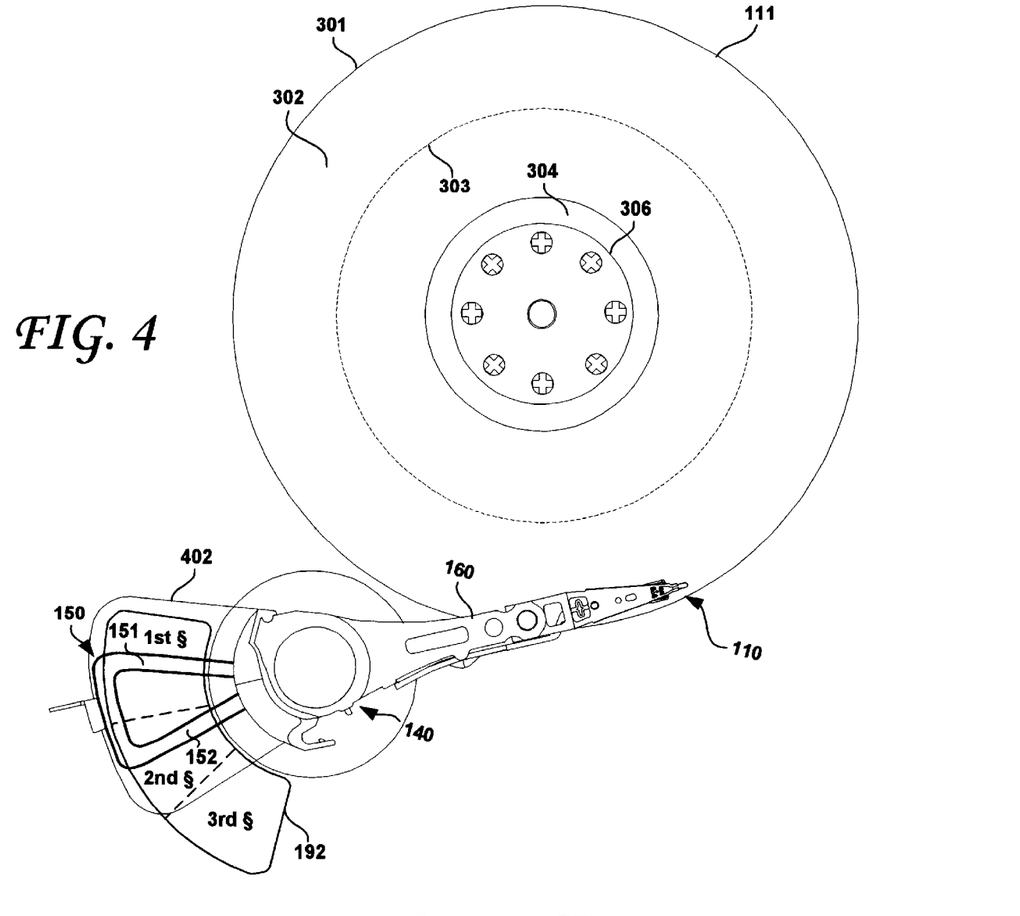
FIG. 4 shows a head stack assembly of the present invention in a first position relative to the voice coil motor magnet and a disk.
Figure 5:
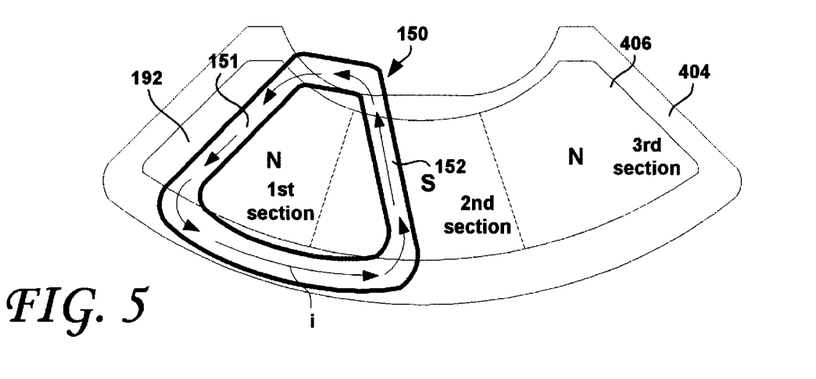
FIG. 5 is a simplified plan view of a VCM coil and a VCM magnet wherein the VCM coil is in a first position, according to an embodiment of the present invention.

FIG. 4 shows a detail of a head stack assembly of a disk drive according to the present invention in a first position relative to the voice coil motor and a disk. FIG. 5 is a simplified plan view that clearly shows the relative position of a VCM coil and a VCM magnet, according to another embodiment of the present invention. Considering now FIGS. 1, 4 and 5 collectively, a disk drive according to the present invention includes a disk 111 (only one disk is shown) having a recording surface. The recording surface, in turn, includes a data portion 302 that may be bounded (for example) by the OD 301 and a MD 303 of the disk 111. In the case wherein the drive 100 is a CSS drive, the disk 111 includes a CSS zone 304 adjacent to the ID 306 of the disk 111. As noted above, the head stack assembly includes an actuator body 140, an actuator arm 160 cantilevered from the actuator body 140 and a head coupled to the HGA 110 for reading from and writing to the data portion 302 of the disk 111. A coil 150 is cantilevered from the actuator body 140 in an opposite direction from the actuator arm 160. As shown, the coil 150 defines a first radial leg 151 and a second radial leg 152.

The VCM magnet 192 is disposed away from the coil 150 so as to define an air gap therewith and to allow the coil 150 to pivot a distance away from the magnet 192. As shown in both FIGS. 4 and 5, according to one embodiment of the present invention, the VCM magnet 192 defines a first section, a second section and a third section. As shown, the second section of the magnet 192 is magnetically polarized in an axial direction (see direction of magnetic flux lines 1910 in FIG. 19) that is opposite to the axial direction of magnetic polarization of the first and third sections. For example, and as shown in FIGS. 4 and 5, the first section of the magnet 192 may be magnetically polarized as a north pole, the second section as a south pole and the third section thereof as a north pole. In any event, the magnetization polarities of any two adjacent sections of the magnet 192 are opposite relative to one another. The magnet 192 shown in FIGS. 4 and 5, therefore, defines a first magnetic polarity transition zone between the first and second sections and a second magnetic polarity transition zone between the second and third sections thereof. The coil 150 of the VCM of the present disk drive (shown in FIGS. 4, 6 and 8 partially encased in a plastic overmold 402) within is configured such that the first and second radial legs 151, 152 thereof span two adjacent sections of the magnet 192. The coil 150 may also be rotated such that the first and second legs face (or are substantially aligned with) the first and second transition zones, as detailed further below.

Figure 8:
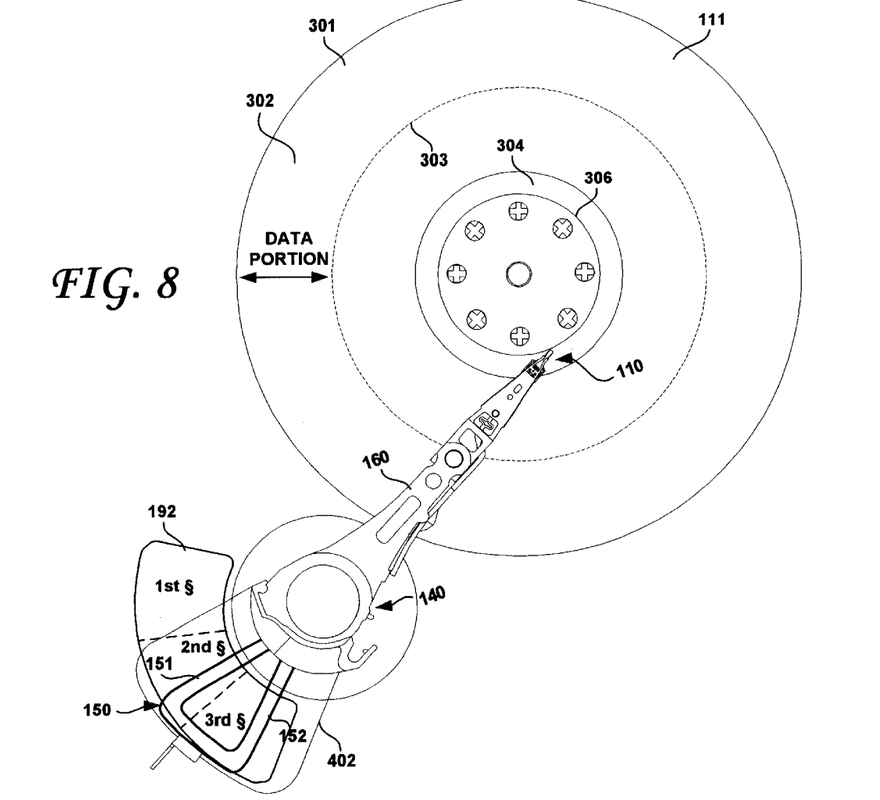
FIG. 8 shows a head stack assembly of the present invention in a third position relative to the voice coil motor magnet and a disk.
Figure 9:
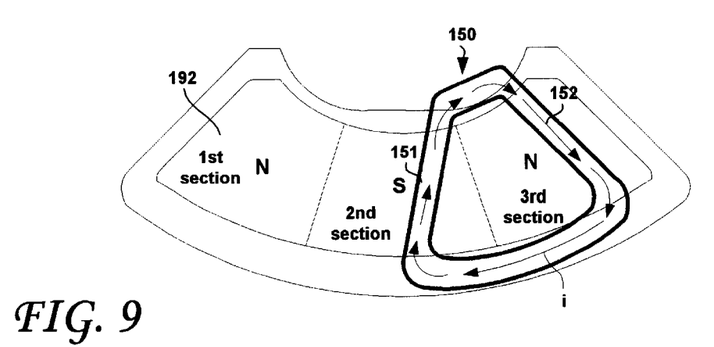
FIG. 9 is a simplified plan view of a VCM coil and a VCM magnet wherein the VCM coil is in a third position, according to an embodiment of the present invention.

According to the present invention, the first radial leg 151 faces the second section and the second radial leg 152 faces the third section of the magnet 192 across the air gap when the head is positioned at a predetermined non-operational position over the disk 111 (as shown in FIGS. 8 and 9). The first radial leg 151 faces the first section and the second radial leg 152 of the coil 150 faces the second section of the magnet 192 across the air gap when the head(s) coupled to the HGA 110 is/are reading from or writing to the data portion 302 of the disk 111 (as shown in FIGS. 4–7).

Figure 6:
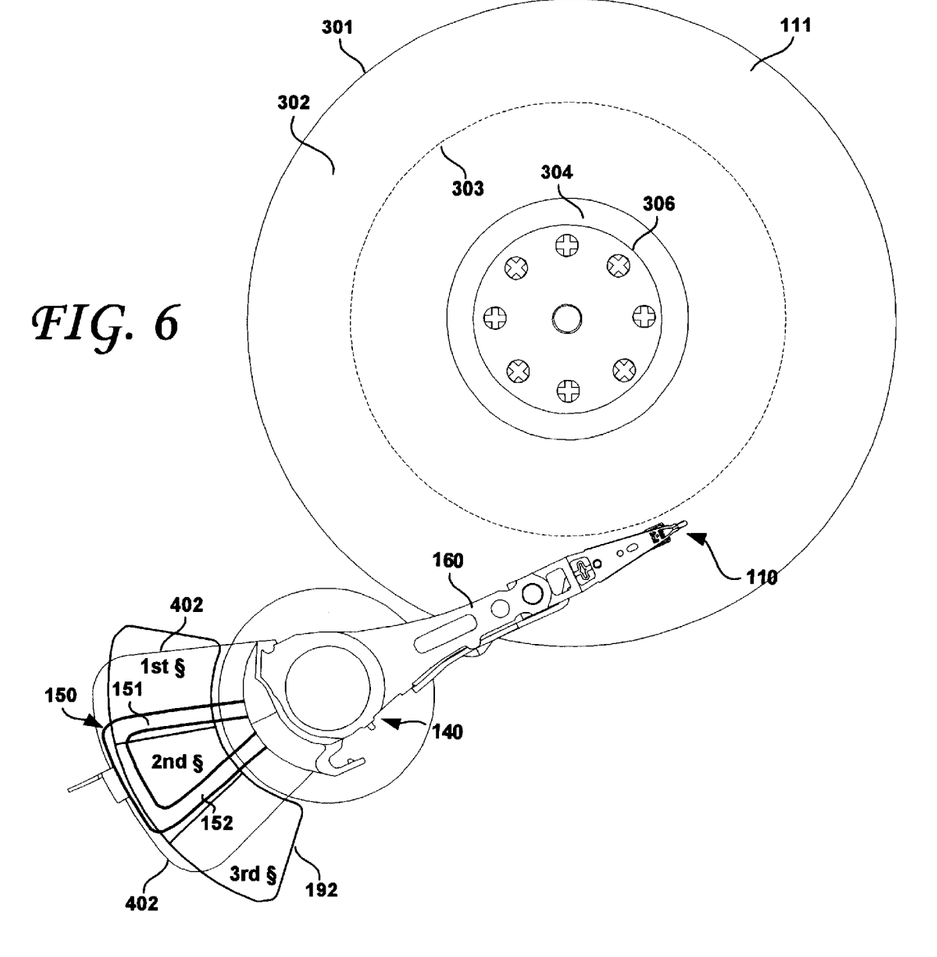
FIG. 6 shows a head stack assembly of the present invention in a second position relative to the voice coil motor magnet and a disk.
Figure 7:
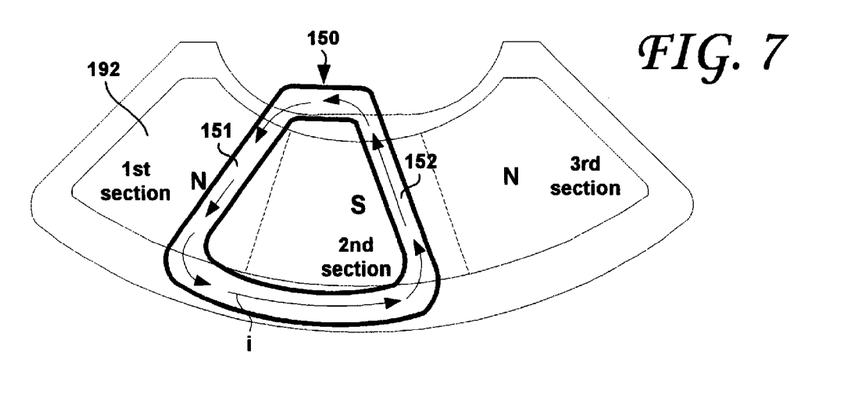
FIG. 7 is a simplified plan view of a VCM coil and a VCM magnet wherein the VCM coil is in a second position, according to an embodiment of the present invention.
Figures 16, 17:
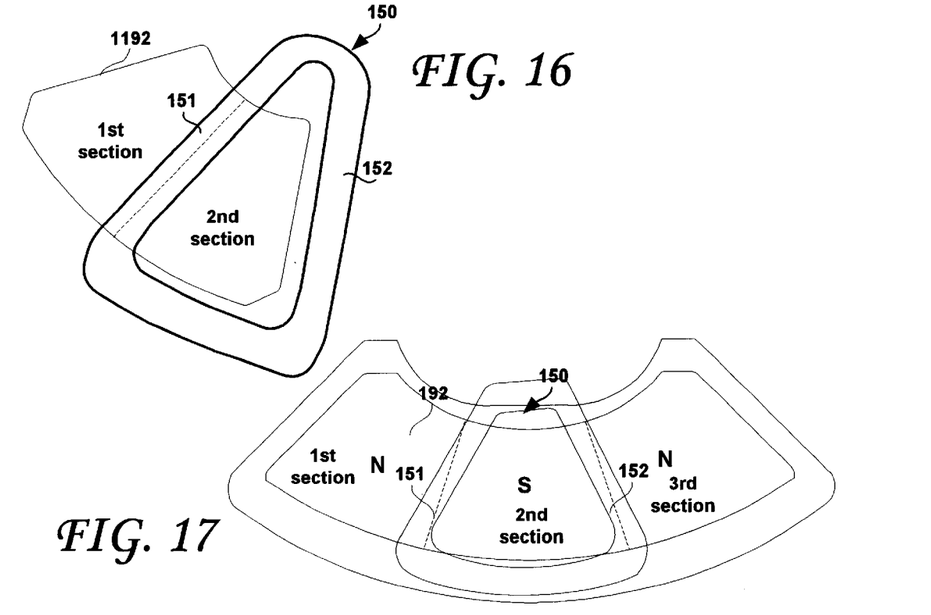
FIG. 16 is a simplified plan view of the VCM magnet and narrow angle coil of FIGS. 11 and 12, in a position wherein zero or substantially zero torque is generated.
FIG. 17 is a simplified plan view of the VCM magnet and narrow angle coil of FIGS. 5, 7 and 9, in a position wherein zero or substantially zero torque is generated.

Whereas FIGS. 4 and 5 show the actuator assembly in an orientation wherein the head is positioned within the data track 302 adjacent the OD 301 of the disk 111, FIGS. 5 and 6 show the actuator assembly in an orientation wherein the head(s) coupled to the HGA 110 has/have been moved to a position within the data portion 302 that is adjacent the MD 303 of the disk 111. The movement of the actuator assembly is carried out through the interaction of the magnetic field of the magnet 192 and the applied current of a first polarity to the coil 150 of the VCM. As shown in FIGS. 5 and 6 the first radial leg 151 still faces the first section of the magnet 192, although closer to the first transition zone defined by the interface between the first and second sections of the magnet 192 than shown in FIGS. 4 and 5. Likewise, the second radial leg still faces the second section of the magnet 192, although closer to the second transition zone defined by the interface between the second and third sections of the magnet 192 than shown in FIGS. 4 and 5. However, as the heads move across the MD 303, the first radial leg 151 crosses the first transition zone between the first and second sections of the magnet 192 as the second leg 152 crosses the second transition zone between the second and third sections of the magnet 192. This position of the coil 150 relative to the magnet 192 is shown in FIG. 17.

As the heads coupled to the HGA 110 move away from the data portion 302 and toward the ID of the disk 111, the coil 150 assumes an orientation relative to the magnet 192 that is shown in FIGS. 8 and 9. As the first radial leg 151 of the coil 150 crosses into the second section and the second radial leg of the coil 150 crosses into the third section of the magnet 192, the polarity of the applied current i must be reversed to maintain the same direction of the torque on the actuator assembly. That is, to maintain the same direction of travel of the coil 150 over the magnet 192, the polarity of the current i applied to the coil 150 must be reversed, as the direction of the magnetic flux lines through which the first and second radial legs 151, 152 cut have also reversed (i.e., from N, S for the first and second sections of the magnet 192 (for example) to S, N for the second and third sections, respectively). Once in the CSS zone 304, the actuator may be latched using, for example, a magnetic latch, as is known in the art. A magnet 192 having two magnetic polarity transition zones, such as shown in FIGS. 4–9 and 19, may advantageously be used in applications in which a high latch force is required. This is because both the first and the second radial legs 151, 152 of the magnet 150 are within and subjected to the magnetic field exerted by the second and third sections of the magnet 192, respectively. Therefore, as the current i is applied to the magnet 192, each of the first and second radial legs 151, 152 contributes torque and, therefore, contributes to the de-latching force.

Figure 10:
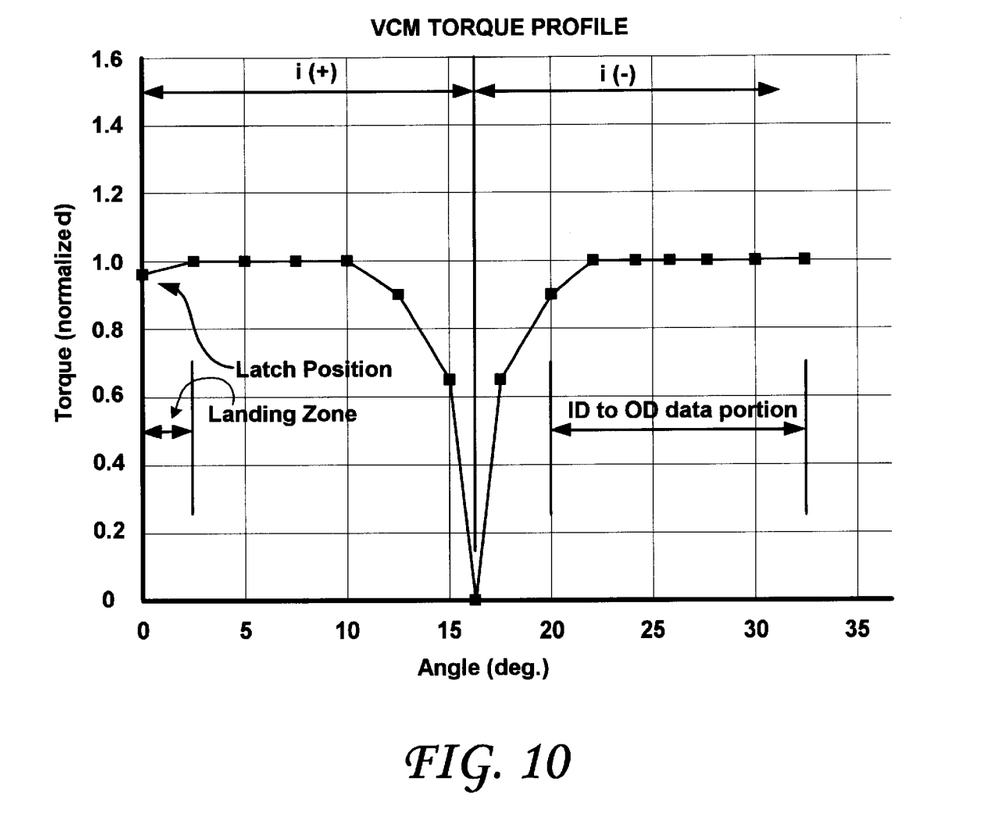
FIG. 10 shows a graph interrelating normalized voice coil motor torque versus stroke angle, for a voice coil motor having a magnet defining two magnetic polarity transitions, according to an embodiment of the present invention.

FIG. 10 shows a graph interrelating normalized voice coil motor torque versus stroke angle, for a voice coil motor having a magnet 192 having two magnetic polarity transitions, according to an embodiment of the present invention. In the exemplary embodiment of FIG. 10, the actuator stroke angle is only about 33 degrees (although the present invention is not limited to such illustrative stroke angle). When the actuator is controlled from about 19 degrees to about 33 degrees, the heads coupled to the HGA 110 are disposed above the data portion 302 of the recording surface of the disk 111. The torque on the actuator is designed to be essentially constant within this range. Similarly, below about 13 degrees stroke angle, the heads coupled to the HGA 110 are disposed at a predetermined non-operational position above or on the recording surface of the disk 111 (such as within and on a CSS zone, for example). Torque is also essentially constant within the CSS zone. As shown, when the stroke angle is zero, the actuator is latched, and held in place with a magnetic latch, for example. Between these two regions of essentially constant torque, the torque profile dips sharply, and reaches zero or substantially zero at about 16 degrees (in this illustrative example). A stroke angle of 16 degrees, therefore, corresponds to a relative position of the coil 150 over the magnet 192 in which the first radial leg 151 of the coil is above the first magnetic polarity transition zone and the second radial leg 152 is positioned above (i.e., across the air gap between the coil 150 and the magnet 192) the second magnetic polarity transition zone between the second and third sections of the magnet 192. When the coil 150 is in this position, essentially no torque is applied to the actuator. The requirement to reverse the polarity of the current i applied to the coil 150 is shown in FIG. 10 as i(+) in the landing zone and i(−) within the data track from the OD to the MD of the disk 111 in the example developed herein. The relative dimensions of the coil 150 and the magnet 192 may be freely chosen to achieve the functionality described herein.

Figure 11:
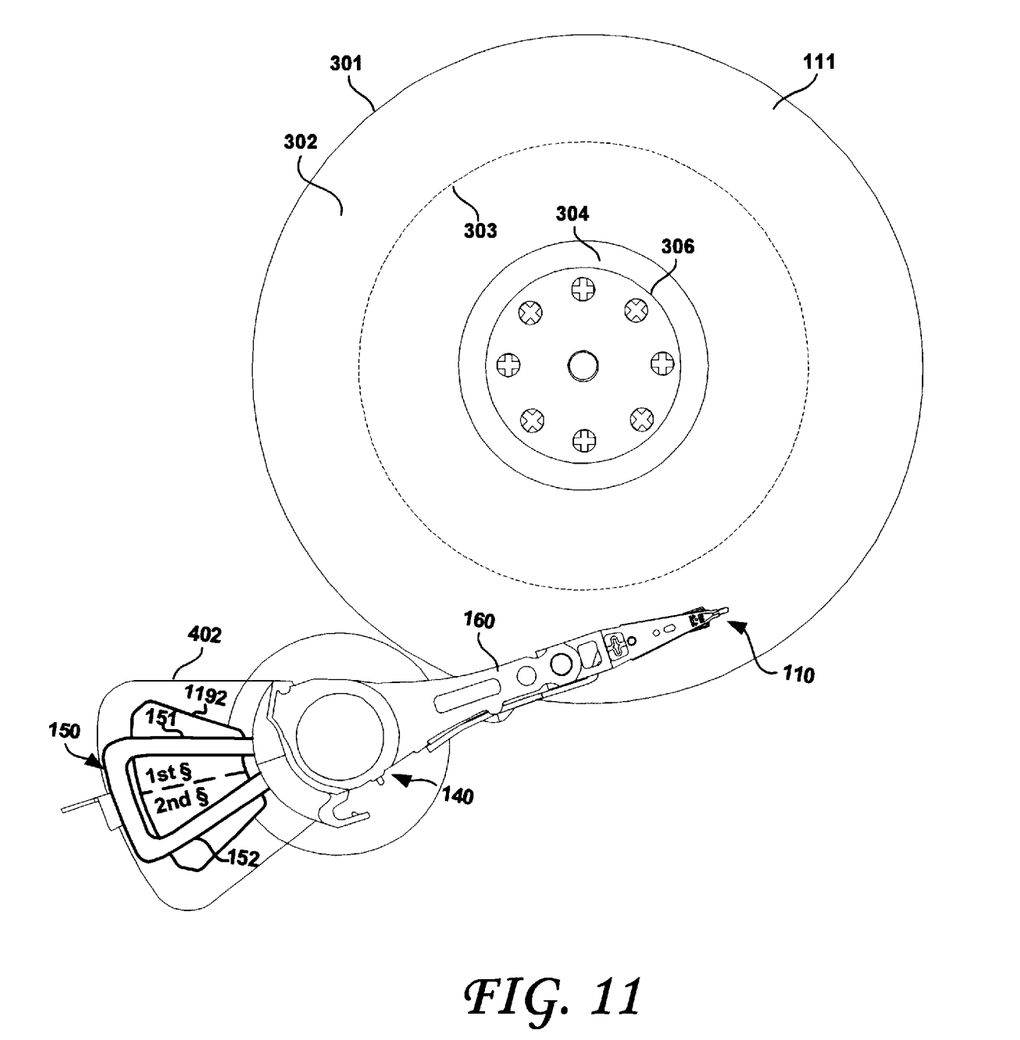
FIG. 11 shows a head stack assembly in a first position relative to the voice coil motor magnet and a disk, according to another embodiment of the present invention.
Figure 12:
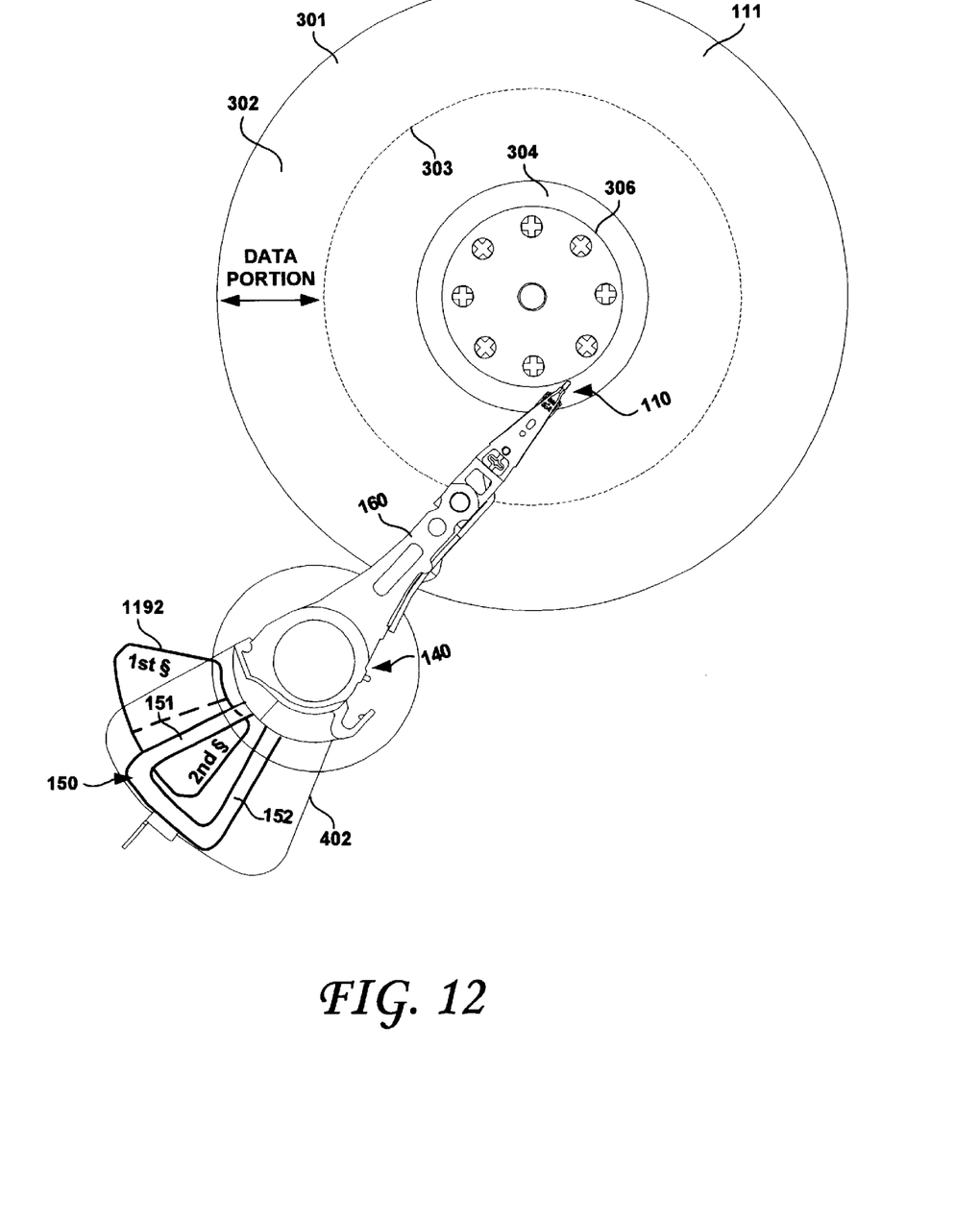
FIG. 12 shows the head stack assembly of FIG. 11 in a second position relative to the voice coil motor and a disk.
Figure 13:
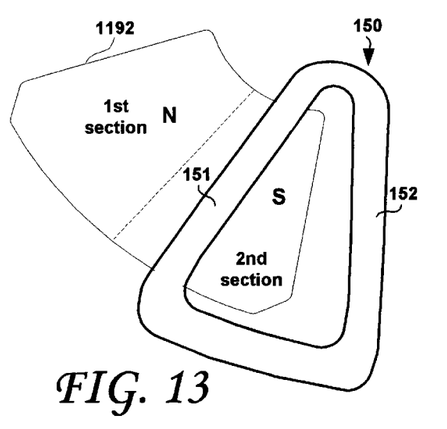
FIG. 13 is a simplified plan view of the VCM magnet and narrow angle coil of FIG. 12.
Figure 14:
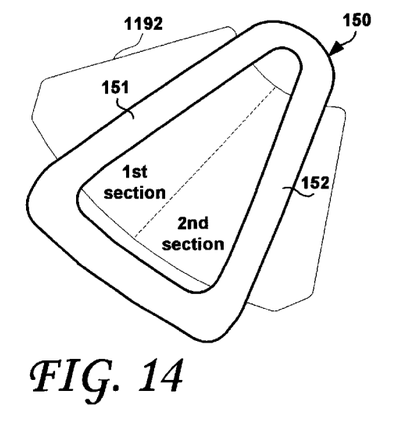
FIG. 14 is a simplified plan view of the VCM magnet and narrow angle coil of FIG. 11.

FIGS. 11 and 12 illustrate another embodiment of the present invention. As shown therein, the VCM magnet 1192 includes a first section that is magnetized in a first axial direction and a second section that is magnetized in a second axial direction that is opposite the first direction. For illustrative and exemplary purposes only, the magnetic polarity of the first section is referred to as north (N) and the magnetic polarity of the second section of the magnet 1192 is referred to hereunder as south (S). The magnet 1192 defines a magnetic polarity transition zone between the first zone and the second zone. As shown in FIGS. 11 and 14, when the head(s) coupled to the HGA 110 face the data portion 302 of the disk 111, the first radial leg 151 of the coil faces the first section of the magnet 1192 and the second radial leg 152 of the coil faces the second section of the magnet 1192. As shown in FIGS. 12 and 13, when the head(s) coupled to the HGA 110 are moved to a non-operational position, such as a latch position, the first radial leg 151 faces the second section and the second radial leg 152 of the coil 150 does not face either the first section or the second section of the magnet 1192. Therefore, only one radial leg (e.g., the first radial leg 151) of the magnet 1192 contributes to the torque on the actuator when current is applied to the coil 150 during de-latching. The relative dimensions of the coil 150 and the magnet 1192 may be freely chosen to achieve the functionality described herein.

Figure 15:
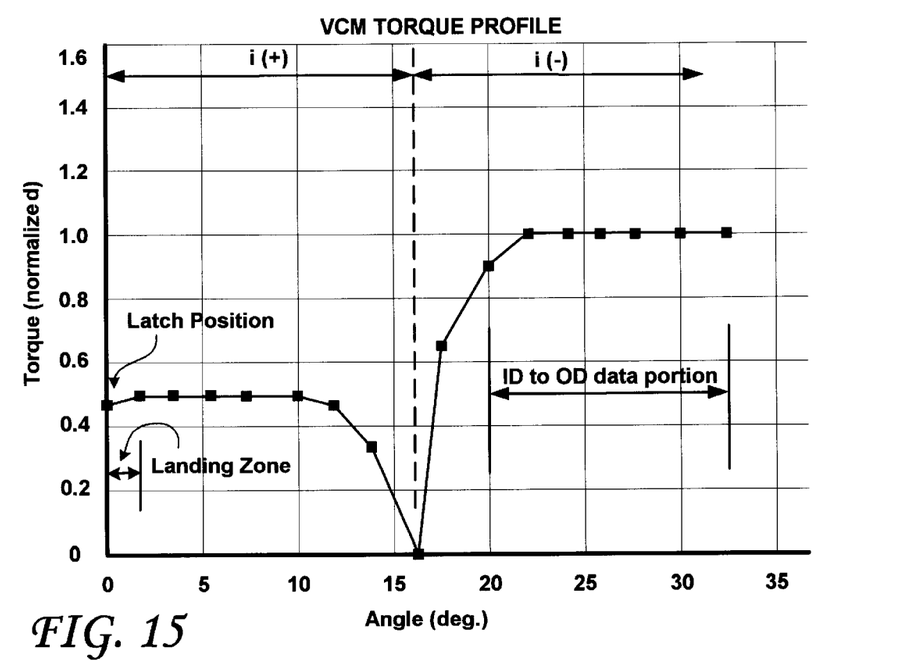
FIG. 15 shows a graph interrelating normalized voice coil motor torque versus stroke angle, for a voice coil motor having a narrow angle coil and a magnet having a single magnetic polarity transition, according to the embodiment of FIG. 11 and 12.

As shown in FIG. 15, the torque applied to the actuator is substantially constant (at a normalized torque of 1) from the ID to the OD of the data portion 302 on the recording surface of the disk 111. Therefore, the torque profile to the right of the magnetic polarity transition shown in dashed lines in FIG. 15 corresponds to the case wherein the coil 150 and the magnet 1192 are in the relative position shown in FIG. 11 and 14. The torque profile to the left of the magnetic polarity transition corresponds to the case wherein the coil 150 and the magnet 1192 are in the relative position illustrated in FIG. 12 and 13. As can be seen therein, as only the first radial leg 151 of the coil 150 produces torque (when current is applied to the VCM coil 150), the torque within the landing zone or at the latched position is about half of the magnitude of the torque exerted on the actuator (assuming a symmetrical coil) when the head(s) coupled to the actuator face the data tracks of the disk 111 and both the radial legs 151, 152 produce torque. When the first radial leg 151 crosses the magnetic transition zone between the first and the second section of the magnet 1192, the magnitude of the torque on the actuator dips, reaching zero or substantially zero at about 16 degrees in the example shown (wherein the actuator swings about a range of about 33 degrees). The relative position of the coil 150 and the magnet 1192 that generates zero or substantially zero torque is shown in FIG. 16.

Figure 18:
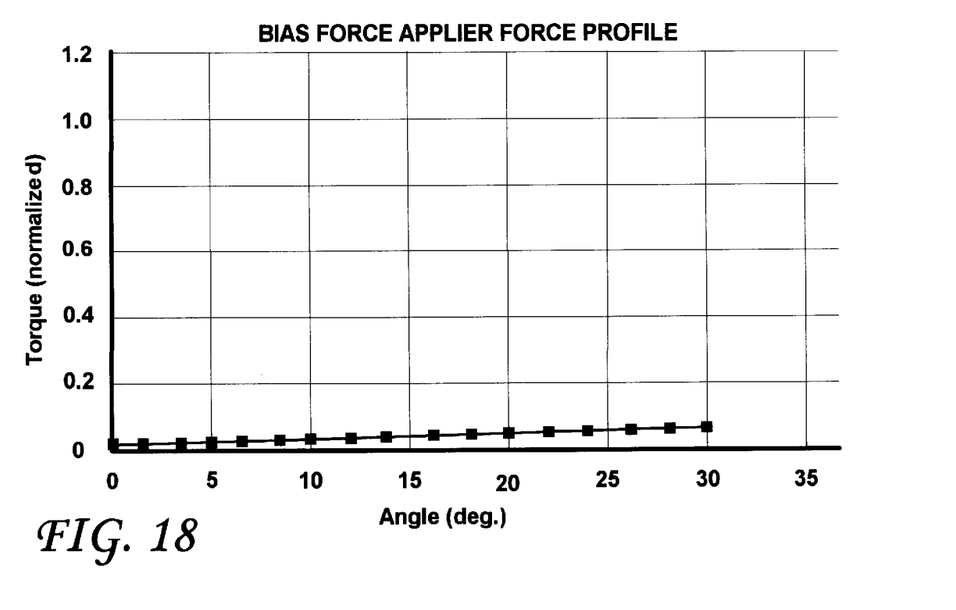
FIG. 18 shows a graph interrelating normalized voice coil motor torque versus stroke angle for a bias force applier, according to another aspect of the present invention.

According to the present invention and as shown in both FIGS. 16 and 17, the coil 150 may be moved to a position wherein at least one of the radial legs 151, 152 of the coil 150 is aligned with a magnetic transition between the first and second section or between the second and third section of the magnet 1192. At or around such magnetic transitions, the magnetic domains of the magnet 1192 are not uniformly aligned. Therefore, when a radial leg of the coil 150 faces such a transition, no or substantially no net torque is produced when current is applied to the coil 150. If the disk drive that incorporates the structures disclosed herein is subjected to a non-operational shock and the actuator de-latches and the coil 150 stops in a position wherein one (FIG. 16) or both (FIG. 17) of the radial legs 151, 152 face the magnetic transition or transitions, the actuator may not be able to move away from this position, as the ability of the VCM to produce torque is essentially zero when the radial leg or legs are in the positions shown in FIGS. 16 and 17. To overcome this potential problem, the present invention provides for the application of a bias force either toward the ID of the disk 111 or toward the OD of the disk 111. The direction of the bias force may be chosen according to the design of the disk drive. For example, the bias force may increase from the ID to the OD of the disk. The profile of an exemplary bias force is shown in the exemplary graph of FIG. 18. In FIG. 18, the bias force applied to the actuator (such as to the actuator body 140, for example) increases from the ID to the OD of the disk 111. The bias force need not be large, but only need be sufficient to urge the coil 150 to a position wherein at least one of the radial legs 151, 152 thereof squarely faces one of the sections of the magnet 192, 1192 and is thus able to exert torque on the actuator.

According to one embodiment of the present invention, the bias force may be applied by means of the flex cable, shown at reference 180 in FIG. 1. However, it is to be understood that other structures may be devised to apply the bias force to the actuator. For example, those of skill in this art may recognize that magnetic or other means may be advantageously employed to generate the bias force discussed herein.

Advantageously, the narrow angle of the coil 150 results in an actuator having a lower inertia. This, in turn, enables the disk drive designer to either reduce the cost of the VCM or to reduce the current applied to the coil 150, thereby obtaining a cooler operation of the drive while maintaining the same seek time performance. Seek time may also be improved while leaving all other parameters of the drive unchanged.

We claim:

1. A disk drive, comprising:
a disk having a recording surface, the recording surface defining a data portion;
a head stack assembly including:
an actuator body;
an actuator arm cantilevered from the actuator body;
a head coupled to the actuator arm for reading from and writing to the data portion;
a coil cantilevered from the actuator body in an opposite direction from the actuator arm, the coil defining a first radial leg and a second radial leg; and
a VCM magnet disposed away from the coil so as to define an air gap, the VCM magnet defining a first section, a second section and a third section, the second section being magnetically polarized in an axial direction that is opposite to an axial direction of magnetic polarization of the first and third sections, wherein the first radial leg faces the second section and the second radial leg faces the third section across the air gap when the head is positioned at a predetermined non-operational position over the disk and wherein the first radial leg faces the first section and the second radial leg faces the second section across the air gap when the head is reading from or writing to the data portion.

2. The disk drive of claim 1, wherein the predetermined non-operational position is located within a contact start stop (CSS) area of the disk.

3. The disk drive of claim 1, wherein the predetermined non-operational position is located away from the disk and adjacent an outer diameter thereof.

4. The disk drive of claim 1, wherein the data portion defined on the recording surface of the disk is bounded by an outer diameter of the disk and a medial diameter of the disk.

5. The disk drive of claim 1, wherein a first magnetic polarity transition zone is defined between the first and second sections, a second magnetic polarity transition zone is defined between the second and third sections and wherein the disk drive is configured to reverse a polarity of a current applied to the coil as the first radial leg passes over the first magnetic polarity transition zone and the second radial leg passes over the second magnetic polarity transition zone.

6. The disk drive of claim 1, further comprising a bias force applier, the bias force applier being configured to apply a force that biases the head stack assembly in a bias direction.

7. The disk drive of claim 6, wherein the bias direction is toward an outer diameter of the disk.

8. The disk drive of claim 6, wherein the bias direction is toward an inner diameter of the disk.

9. A disk drive, comprising:
a disk having a recording surface, the recording surface defining a data portion,
a head stack assembly including:
an actuator body;
an actuator arm cantilevered from the actuator body,
a head coupled to the actuator arm for reading from and writing to the data portion;
a coil cantilevered from the actuator body in an opposite direction from the actuator arm, the coil defining a first radial leg and a second radial leg; and
a VCM magnet disposed away from the coil so as to define an air gap, the VCM magnet defining a first section and a second section, the first section being magnetically polarized in an axial direction that is opposite to an axial direction of magnetic polarization of the second section, wherein the first and second radial legs respectively face the first and the second sections across the air gap when the head is positioned over the data portion and wherein only the first radial leg faces the second section when the head is at a predetermined non-operational position over the disk.

10. The disk drive of claim 9, wherein the predetermined non-operational position is located within a contact start stop (CSS) area of the disk.

11. The disk drive of claim 9, wherein the predetermined non-operational position is located away from the disk and adjacent an outer diameter thereof.

12. The disk drive of claim 9, wherein the data portion defined on the recording surface of the disk is bounded by an outer diameter of the disk and a medial diameter of the disk.

13. The disk drive of claim 9, further comprising a bias force applier, the bias force applier being configured to apply a force that biases the head stack assembly in a bias direction.

14. The disk drive of claim 9, wherein the bias direction is toward an inner diameter of the disk.

15. The disk drive of claim 9, wherein the bias direction is toward an outer diameter of the disk.

* * * * *